(12) United States Patent
Farah et al.

(10) Patent No.: US 8,992,173 B2
(45) Date of Patent: Mar. 31, 2015

(54) TIE-ROD NUT INCLUDING A NUT FLANGE WITH A PLURALITY OF MOUNTING APERTURES

(75) Inventors: Jorge I. Farah, Hartford, CT (US); David T. Feindel, Ellington, CT (US)

(73) Assignee: United Technologies Corporation, Hartford, CT (US)

( * ) Notice: Subject to any disclaimer, the term of this patent is extended or adjusted under 35 U.S.C. 154(b) by 457 days.

(21) Appl. No.: 13/289,718

(22) Filed: Nov. 4, 2011

(65) Prior Publication Data

US 2013/0115079 A1 May 9, 2013

(51) Int. Cl.
| | |
|---|---|
| F04D 29/44 | (2006.01) |
| F04D 29/54 | (2006.01) |
| F01D 9/00 | (2006.01) |
| F01D 25/28 | (2006.01) |
| F01D 9/06 | (2006.01) |
| F02C 7/20 | (2006.01) |

(52) U.S. Cl.
CPC ...... *F01D 25/28* (2013.01); *F01D 9/06* (2013.01); *F02C 7/20* (2013.01); *F05D 2260/20* (2013.01); *F05D 2260/31* (2013.01)
USPC .......................................................... 415/201

(58) Field of Classification Search
CPC ......... F01D 25/28; F01D 25/26; F01D 9/065; F04D 29/40
USPC .............. 415/108, 110, 113, 142, 201, 214.1; 416/244 R; 411/140, 388; 403/335, 337
See application file for complete search history.

(56) References Cited

U.S. PATENT DOCUMENTS

| | | | |
|---|---|---|---|
| 2,387,257 A | | 7/1944 | Haas |
| 3,084,849 A | * | 4/1963 | Dennison ....................... 415/175 |
| 4,050,479 A | * | 9/1977 | Baumann ......................... 138/42 |
| 4,478,551 A | | 10/1984 | Honeycutt |
| 4,821,758 A | | 4/1989 | Ruis |
| 5,071,299 A | | 12/1991 | Sekine et al. |
| 5,076,049 A | | 12/1991 | Von Benken et al. |
| 5,160,251 A | * | 11/1992 | Ciokajlo ....................... 415/142 |
| 5,292,227 A | * | 3/1994 | Czachor et al. ............. 415/209.3 |
| 5,482,431 A | * | 1/1996 | Taylor ........................... 415/111 |
| 5,690,005 A | | 11/1997 | Jung et al. |
| 6,016,724 A | | 1/2000 | Janton |
| 6,116,833 A | | 9/2000 | Ellis |
| 6,213,885 B1 | | 4/2001 | Bachle |
| 6,561,723 B2 | | 5/2003 | McCurdy et al. |
| 7,207,769 B2 | * | 4/2007 | Tanioka ......................... 415/118 |
| 7,975,488 B2 | | 7/2011 | Farah et al. |
| 2007/0196196 A1 | | 8/2007 | Schorling et al. |
| 2009/0238678 A1 | * | 9/2009 | Nyamu et al. ................. 415/116 |
| 2010/0132372 A1 | * | 6/2010 | Durocher et al. ................ 60/796 |
| 2010/0132374 A1 | * | 6/2010 | Manteiga et al. ............... 60/796 |
| 2011/0214433 A1 | | 9/2011 | Feindel et al. |

OTHER PUBLICATIONS

International search report for PCT/US2012/063338 dated Mar. 19, 2013.

* cited by examiner

*Primary Examiner* — Dwayne J White
*Assistant Examiner* — Brian P Wolcott
(74) *Attorney, Agent, or Firm* — O'Shea Getz P.C.

(57) ABSTRACT

A tie-rod nut includes a nut base that extends between a first nut end and a second nut end, and a nut flange that extends radially outwards from the nut base at the first nut end. The nut base includes a nut bore with a threaded bore region that extends axially from the second nut end towards the first nut end. The nut flange includes a plurality of mounting apertures that are arranged circumferentially around the nut base. The nut flange may be connected to a substrate by a fastener that extends through a first one of the plurality of mounting apertures.

20 Claims, 3 Drawing Sheets

US 8,992,173 B2

TIE-ROD NUT INCLUDING A NUT FLANGE WITH A PLURALITY OF MOUNTING APERTURES

BACKGROUND OF THE INVENTION

1. Technical Field

The present invention relates to tie-rod nuts and, in particular, to a tie-rod nut that includes a nut flange with a plurality of mounting apertures.

2. Background Information

Tie-rod nuts may be utilized in a wide range of applications. A tie-rod nut, for example, may be included in a gas turbine engine system for connecting a tie-rod to an engine case. A first end of the tie-rod nut may be seated in an aperture in the engine case. A threaded second end of the tie-rod nut may be screwed onto a threaded end of the tie-rod. Such a tie-rod nut configuration, however, may tilt and partially lift away from the engine case, for example, when the tie-rod is subject to a bending load. The tilting and lifting may cause fluid leakage between the tie-rod nut and the engine case, which may reduce engine efficiency and performance

SUMMARY OF THE DISCLOSURE

According to a first aspect of the invention, a tie-rod nut includes a nut base and a nut flange. The nut base includes a nut bore and a flow aperture. The nut bore extends axially through the nut base between a first nut end and a second nut end, and includes a threaded bore region. The flow aperture extends radially outwards from the nut bore through the nut base. The nut flange extends radially outwards from the nut base at the first nut end, and includes a plurality of mounting apertures that are arranged circumferentially around the nut base and that extend axially through the nut flange. The flow aperture is arranged axially between the threaded bore region and the nut flange.

According to a second aspect of the invention, a gas turbine engine system includes a first engine case, a second engine case that includes a nut aperture, a tie-rod nut and a tie-rod. The tie-rod nut includes a nut base that extends through the nut aperture between a first nut end and a second nut end, and a nut flange that extends radially outwards from the nut base at the first nut end. The nut base includes a nut bore with a threaded bore region that extends axially from the second nut end towards the first nut end. The nut flange includes a plurality of mounting apertures that are arranged circumferentially around the nut base. The nut flange is connected to the second engine case by a fastener that extends through a first one of the plurality of mounting apertures. The tie-rod extends from the first engine case to a threaded tie-rod mounting segment that is mated with the threaded bore region.

The foregoing features and the operation of the invention will become more apparent in light of the following description and the accompanying drawings.

DETAILED DESCRIPTION OF THE INVENTION

Figure 1:
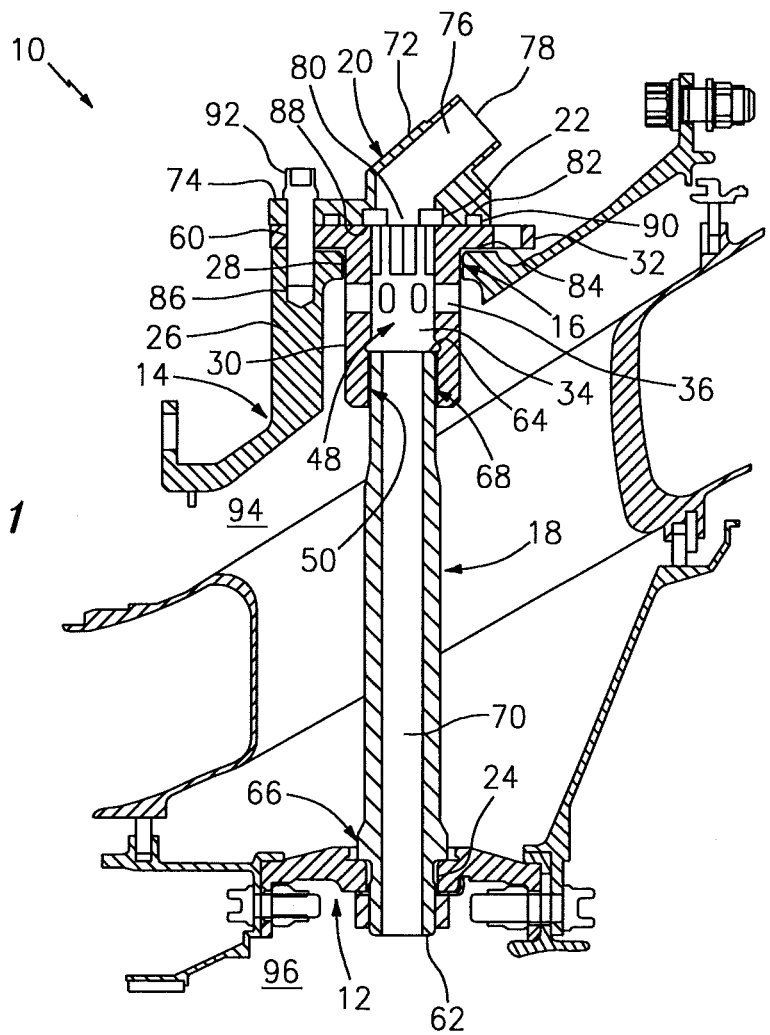
FIG. 1 is a cross-sectional illustration of a gas turbine engine system.

FIG. 1 is a cross-sectional illustration of a gas turbine engine system 10 (e.g., a section of a turbine stage for a gas turbine engine). The system 10 includes an annular first engine case 12 (e.g., an inner radial engine case), an annular second engine case 14 (e.g., an outer radial engine case), a tie-rod nut 16, a tie-rod 18, a fluid supply fitting 20 and a flow constrictor 22 (e.g., an annular flow constrictor plate).

The first engine case 12 includes a tie-rod aperture 24 that extends therethrough. The second engine case 14 includes a tie-rod nut mount 26 with a tie-rod nut aperture 28 that extends through the second engine case 14.

Figure 2:
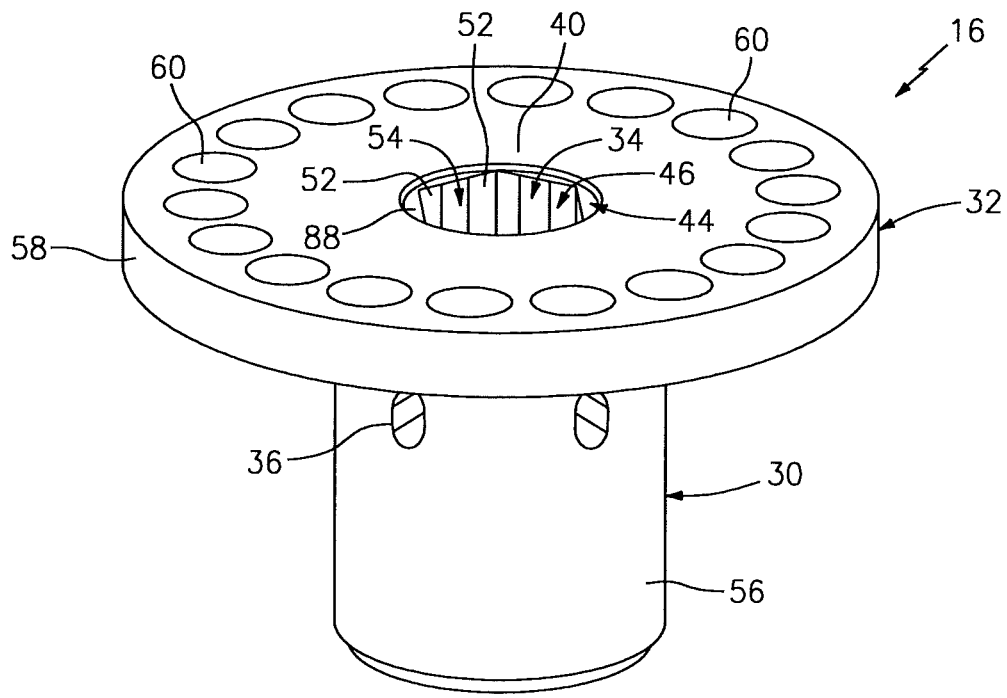
FIG. 2 is a perspective illustration of a tie-rod nut.
Figure 3:
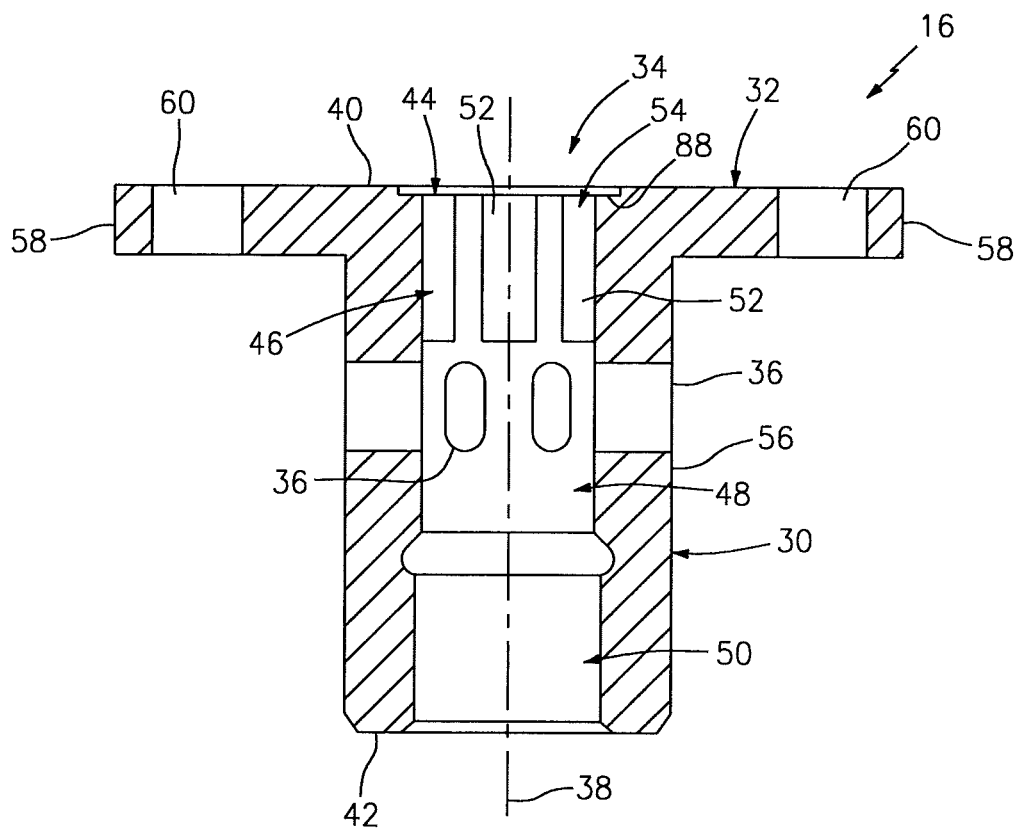
FIG. 3 is a cross-sectional illustration of the tie-rod nut illustrated in FIG. 2.

FIG. 2 is a perspective illustration of the tie-rod nut 16. FIG. 3 is a cross-sectional illustration of the tie-rod nut 16. Referring to FIGS. 2 and 3, the tie-rod nut 16 includes a nut base 30 and a nut flange 32.

Referring to FIG. 3, the nut base 30 may include a nut bore 34 and one or more nut flow apertures 36. The nut bore 34 extends along an axial centerline 38 through the nut base 30 between a first nut end 40 and a second nut end 42. The nut bore 34 may include a flow constrictor mounting region 44, a keyway region 46, a flow distribution region 48, and a threaded bore region 50. The flow constrictor mounting region 44 extends axially between the first nut end 40 and the keyway region 46. The keyway region 46 includes a plurality of elongated grooves 52 that may collectively form a wrench socket 54 recessed within the nut base 30; e.g., a modified hexagonal wrench socket (see FIGS. 2 and 3), a Torx®-type wrench socket, a splined wrench socket, etc. The elongated grooves 52 extend axially between the flow constrictor mounting region 44 and the flow distribution region 48. The elongated grooves 52 also extend partially, radially into the nut base 30. The flow distribution region 48 extends axially between the keyway region 46 and the threaded bore region 50. The threaded bore region 50 extends axially between the flow distribution region 48 and the second nut end 42. The nut flow apertures 36 are arranged circumferentially around the axial centerline 38. Each nut flow aperture 36 extends radially through the nut base 30 between the flow distribution region 48 and an outer radial nut base surface 56. Each nut flow aperture 36 may have an elongated (e.g., oval) cross-sectional geometry.

Referring to FIGS. 2 and 3, the nut flange 32 extends radially outwards from the nut base 30, at the first nut end 40, to a distal flange end 58. The nut flange 32 may also extend circumferentially around the flow constrictor mounting region 44 and the keyway region 46. The nut flange 32 includes a plurality of mounting apertures 60 that are arranged circumferentially and, for example, substantially uniformly around the nut base 30. The quantity of the mounting apertures 60 (e.g., between about twelve and twenty-four) may be selected to provide a predetermined amount of over-rotation (e.g., angle of turn and torque resolution) during assembly, which will be discussed below in more detail. Each of the mounting apertures 60 extends axially through the nut flange 32, and may have a circular cross-sectional geometry.

Referring again to FIG. 1, the tie-rod 18 extends from a first tie-rod end 62 to a second tie-rod end 64. The tie-rod 18 may include a first tie-rod mounting segment 66, a threaded second tie-rod mounting segment 68, and a tie-rod bore 70. The first tie-rod mounting segment 66 extends from the first tie-rod end 62 towards the second tie-rod end 64, and may be shaped to provide anti-rotation, clocking and orientation of the tie-rod 18 and the tie-rod aperture 24. The threaded second tie-rod mounting segment 68 extends from the second tie-rod end 64 towards the first tie-rod end 62. The tie-rod bore 70 extends axially through the tie-rod 18 between the first tie-rod end 62 and the second tie-rod end 64.

The fluid supply fitting 20 includes a fitting base 72 and a fitting flange 74. The fitting base 72 includes a fluid supply passage 76 that extends between a fluid inlet 78 and a fluid outlet 80. The fitting flange 74 extends circumferentially around the fitting base 72. The fitting flange 74 may include a seal channel 82 that extends circumferentially around the fluid outlet 80.

Figure 4:
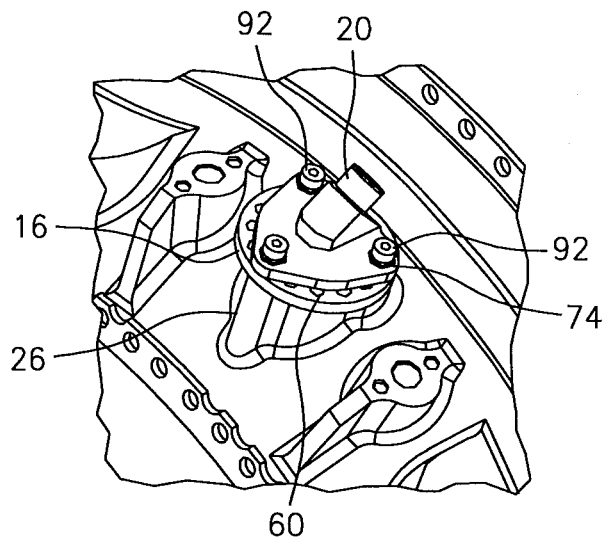
FIG. 4 is a partial perspective illustration of the system illustrated in FIG. 1.

During assembly of the system 10 illustrated in FIG. 1, the first engine case 12 may be concentrically arranged within the second engine case 14. The first tie-rod mounting segment 66 is inserted into the tie-rod aperture 24, and secured to the first engine case 12. The nut base 30 is inserted into the tie-rod nut aperture 28. The threaded bore region 50 is mated with the threaded second tie-rod mounting segment 68. The tie-rod nut 16, for example, may be screwed onto the tie-rod 18 (e.g., with a tool having a hexagonal head) until the nut flange 32 contacts an exterior surface 84 of the tie-rod nut mount 26, and the tie-rod 18 is subjected to a certain preload. The tie-rod nut 16 may subsequently be slightly over-rotated until one or more of the mounting apertures 60 are aligned with respective mounting apertures 86 in the tie-rod nut mount 26. The flow constrictor 22 is seated within the nut bore 34 (e.g., in the flow constrictor mounting region 44 in FIG. 3) against an annular shelf 88 (see also FIG. 3). An annular seal 90 is disposed within the seal channel 82. The fluid supply fitting 20 is disposed on the tie-rod nut 16 such that the flow constrictor 22 is seated within the fluid outlet 80. Referring to FIGS. 1 and 4, the fluid supply fitting 20 and the tie-rod nut 16 are connected to the tie-rod nut mount 26 by one or more fasteners 92 that extend through the fitting flange 74 and respective mounting apertures 60 and into respective mounting apertures 86.

During operation of the system 10 illustrated in FIG. 1, cooling fluid (e.g., cooling air bled from an engine fan stage or an engine compressor stage) flows through the fluid supply passage 76 and the flow constrictor 22, and into the nut bore 34. The flow distribution region 48 directs a first portion of the cooling fluid through the nut flow apertures 36 and into a first plenum 94 located between the first engine case 12 and the second engine case 14. The flow distribution region 48 directs a second portion of the cooling fluid through the tie-rod bore 70 and into a second plenum 96 located within the first engine case 12.

Figure 5:
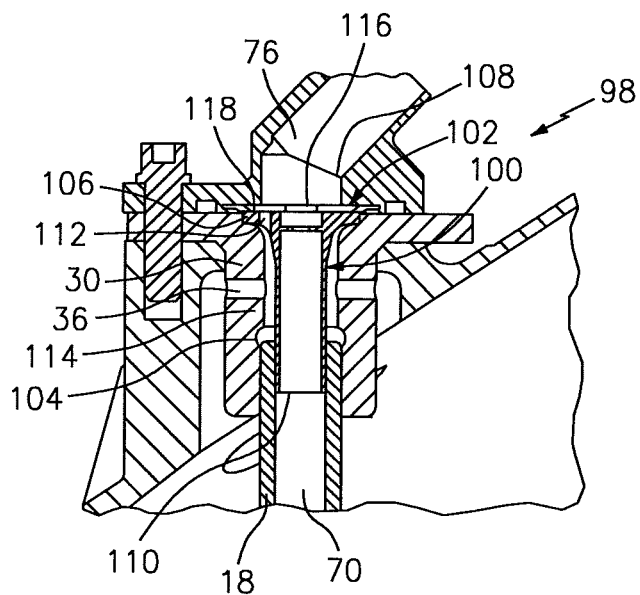
FIG. 5 is a partial cross-sectional illustration of another gas turbine engine system.
Figure 6:
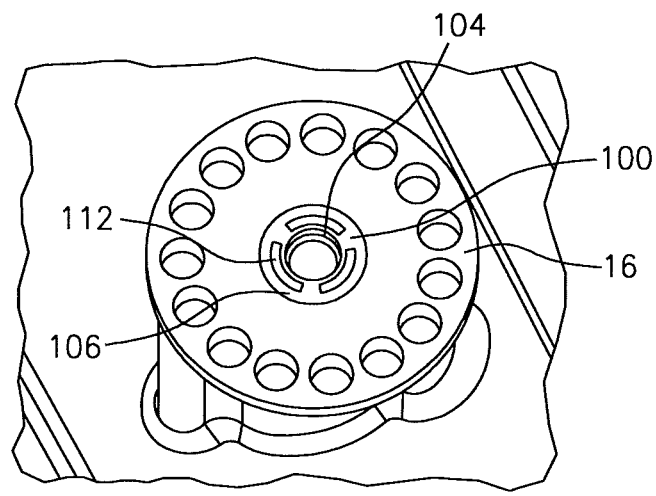
FIG. 6 is a perspective illustration of a tie-rod nut and a first flow distributor included in the system illustrated in FIG. 5.
Figure 7:
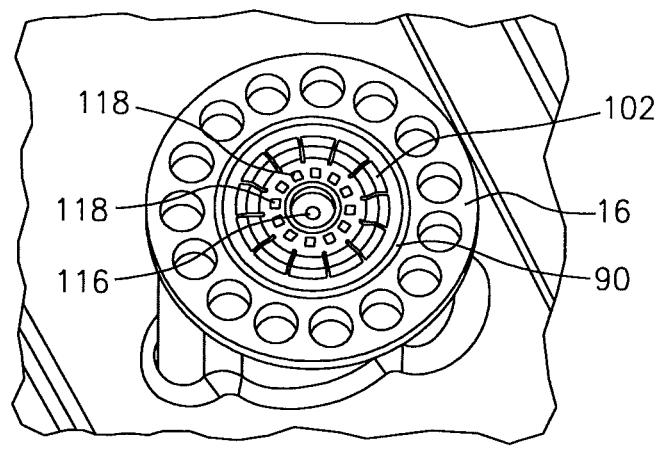
FIG. 7 is a perspective illustration of the tie-rod nut and a second flow distributor included in the system illustrated in FIG. 5.

During certain operating conditions, the first engine case 12 and the second engine case 14 may shift relative to one another. These shifts may subject the tie-rod 18 to relatively large bending loads. The nut flange 32 may remain seated and, thus sealed against the tie-rod nut mount 26, however, due to, for example, its relatively large overlap over and its mechanical connection (e.g., via the fasteners 92) to the tie-rod nut mount 26. The tie-rod nut 16 therefore may reduce leakage through the tie-rod nut aperture 28 and, thus, increase engine efficiency and/or performance FIG. 5 is a partial cross-sectional illustration of another gas turbine engine system 98. The system 98 may include a first flow distributor 100 and a second flow distributor 102, which distributors may replace the flow constrictor 22 illustrated in FIG. 1. FIG. 6 is a perspective illustration of the first flow distributor 100 mounted in the tie-rod nut 16. FIG. 7 is a perspective illustration of the second flow distributor 102 mounted on the first flow distributor 100 (not shown).

Referring to FIG. 5, the first flow distributor 100 includes a tubular distributor base 104 and a distributor flange 106. The distributor base 104 extends from a first distributor end 108 to a second distributor end 110. The second distributor end 110 extends into the tie-rod bore 70, and is connected to the tie-rod 18. The distributor flange 106 extends radially from the distributor base 104, at the first distributor end 108, to the nut base 30. Referring to FIGS. 5 and 6, the distributor flange 106 includes one or more first flow distribution apertures 112 (e.g., circumferentially elongated slots). The first flow distribution apertures 112 are arranged circumferentially around the distributor base 104, and extend axially through the distributor flange 106. Referring again to FIG. 5, the first flow distribution apertures 112 are connected to the flow apertures 36 through a flow passage 114 formed between the nut base 30 and the distributor base 104.

The second flow distributor 102 is seated within the distributor base 104 and against the distributor flange 106. Referring to FIGS. 5 and 7, the second flow distributor 102 includes a first flow distribution aperture 116 and one or more second flow distribution apertures 118. The first flow distribution aperture 116 extends axially through the second flow distributor 102. The first flow distribution aperture 116 may direct a first portion of the cooling fluid flowing through the fluid supply passage 76 into the distributor base 104. The second flow distribution apertures 118 are arranged circumferentially around the first flow distribution aperture 116, and extend axially through the second flow distributor 102. The second flow distribution apertures 118 may direct a second portion of the cooling fluid to the first flow distribution apertures 112.

One of ordinary skill in the art will appreciate that concentric engine cases may be connected together by a plurality of tie-rod nut and tie-rod assemblies. In addition, the number of apertures and the geometrical configuration of the apertures, the bores and the flanges illustrated in the figures are provided as examples. One of ordinary skill in the art will appreciate therefore that alternative embodiments of the gas turbine engine system may include different numbers of apertures and/or different aperture, bore and/or flange configurations.

While various embodiments of the present invention have been disclosed, it will be apparent to those of ordinary skill in the art that many more embodiments and implementations are possible within the scope of the invention. Accordingly, the present invention is not to be restricted except in light of the attached claims and their equivalents.

What is claimed is:

1. A tie-rod nut, comprising:
   a nut base comprising a nut bore and a flow aperture, wherein the nut bore extends axially through the nut base between a first nut end and a second nut end, and comprises a threaded bore region, and wherein the flow aperture extends radially outwards from the nut bore through the nut base; and
   a nut flange extending radially outwards from the nut base at the first nut end, and comprising a plurality of mounting apertures that are arranged circumferentially around the nut base and that extend axially through the nut flange;
   wherein the flow aperture is arranged axially between the threaded bore region and the nut flange.

2. The tie-rod nut of claim 1, wherein the flow aperture is one of a plurality of flow apertures that extend radially outward from the nut bore through the nut base, and wherein the flow apertures are arranged circumferentially around the nut bore.

3. The tie-rod nut of claim 1, wherein the mounting apertures are arranged substantially uniformly around the nut base.

4. The tie-rod nut of claim 1, wherein the nut bore further comprises a keyway region that comprises a plurality of elongated grooves that extend partially into the nut base, and that are arranged circumferentially around an axial centerline of the nut bore.

5. The tie-rod nut of claim 4, wherein the keyway region is arranged axially between the first nut end and the flow aperture.

6. The tie-rod nut of claim 4, wherein the elongated grooves form a wrench socket within the nut bore.

7. A gas turbine engine system, comprising:
a first engine case;
a second engine case comprising a nut aperture;
a tie-rod nut comprising a nut base that extends through the nut aperture between a first nut end and a second nut end, and a nut flange that extends radially outwards from the nut base at the first nut end, wherein the nut base comprises a nut bore with a threaded bore region that extends axially from the second nut end towards the first nut end, wherein the nut flange comprises a plurality of mounting apertures that are arranged circumferentially around the nut base, and wherein the nut flange is connected to the second engine case by a fastener that extends through a first one of the plurality of mounting apertures; and
a tie-rod extending from the first engine case to a threaded tie-rod mounting segment that is mated with the threaded bore region.

8. The gas turbine engine system of claim 7, wherein the mounting apertures are arranged substantially uniformly around the nut base.

9. The gas turbine engine system of claim 7, wherein the nut base further comprises a wrench socket that is recessed axially into the nut base.

10. The gas turbine engine system of claim 7, wherein the nut bore extends axially through the nut base between the first nut end and the second nut end.

11. The gas turbine engine system of claim 10, wherein the nut base further comprises a flow aperture that extends radially outwards from the nut bore through the nut base, and is arranged axially between the nut aperture and the threaded bore region.

12. The gas turbine engine system of claim 11, wherein the flow aperture is one of a plurality of flow apertures that extend radially outward from the nut bore through the nut base, and are arranged circumferentially around the nut bore.

13. The gas turbine engine system of claim 11, wherein the tie-rod comprises a tie-rod bore that extends axially through the tie-rod, and that is connected to the nut bore.

14. The gas turbine engine system of claim 13, further comprising a first flow distributor that comprises
a tubular distributor base that extends from a first distributor end to a second distributor end that is connected to the tie-rod; and
a distributor flange that extends radially outwards from the tubular distributor base and is connected to the nut base, and comprises a first flow distribution aperture that extends through the distributor flange and is connected to the flow aperture.

15. The gas turbine engine system of claim 14, further comprising a second flow distributor connected to the first distributor end, wherein the second flow distributor comprises a second flow distribution aperture that directs a first portion of a fluid flow into the tubular distributor base, and a third flow distribution aperture that directs a second portion of the fluid flow into the first flow distribution aperture.

16. The gas turbine engine system of claim 10, further comprising a fluid supply fitting with a fluid outlet that is connected to the nut bore, wherein the nut flange is arranged between the second engine case and the fluid supply fitting, and wherein the fluid supply fitting is connected to the second engine case by the fastener.

17. The gas turbine engine system of claim 16, wherein the fastener is one of a plurality of fasteners, each of which extends through a respective one of the plurality of the mounting apertures and connects the fluid supply fitting to the second engine case.

18. The gas turbine engine system of claim 16, further comprising an annular seal arranged between the nut flange and the fluid supply fitting.

19. The gas turbine engine system of claim 16, further comprising an annular flow constrictor arranged within the fluid outlet.

20. The gas turbine engine system of claim 10, wherein the nut bore further comprises a keyway bore region that comprises a plurality of elongated grooves that extend partially into the nut base, and that are arranged circumferentially around an axial centerline of the nut bore.

\* \* \* \* \*